W. BEST.
SEPARATOR FOR STORAGE BATTERIES.
APPLICATION FILED DEC. 10, 1919.
1,375,550.
Patented Apr. 19, 1921.
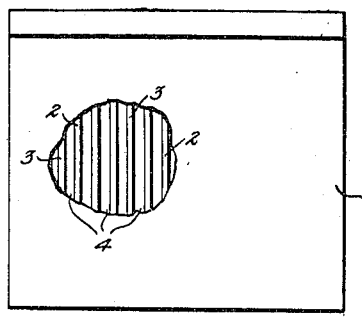
Fig. 1.
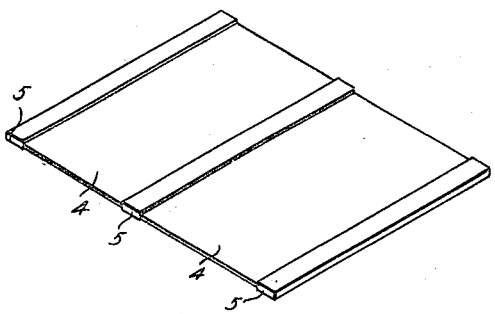
Fig. 6.
Fig. 2.
Fig. 3.
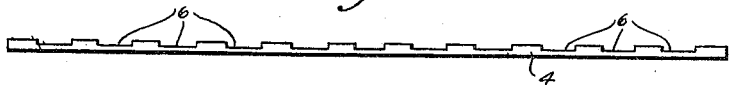
Fig. 4.
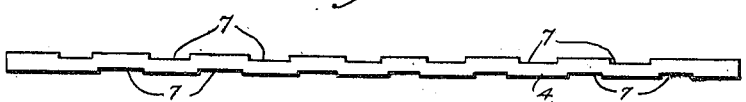
Fig. 5.
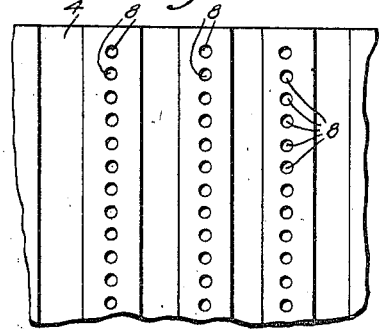
WITNESSES
INVENTOR
WILLIAM BEST.
BY
ATTORNEYS

UNITED STATES PATENT OFFICE.

WILLIAM BEST, OF KANSAS CITY, MISSOURI.

SEPARATOR FOR STORAGE BATTERIES.

1,375,550.  Specification of Letters Patent.  Patented Apr. 19, 1921.

Application filed December 10, 1919. Serial No. 343,819.

*To all whom it may concern:*

Be it known that I, WILLIAM BEST, a citizen of the United States, and a resident of Kansas City, in the county of Jackson and State of Missouri, have invented a new and Improved Separator for Storage Batteries, of which the following is a full, clear, and exact description.

This invention relates to improvements in separators for storage batteries, an object of the invention being to provide a separator of slate which will be acidproof and a perfect insulator, which will withstand enormous heat without deterioration, and which will last indefinitely with any ordinary care.

Heretofore, separators for storage batteries have ordinarily been of wood. In some cases the wood has been treated in some fashion or another to lengthen its life. It is my idea to utilize a slate separator located between the plates of the storage battery and I preferably employ slate, such as found in Arkansas, which contains a high percentage of silicon, normally about eighty-six per cent., and has a very low percentage of injurious ingredients, and an entire absence of metallic substances.

With these and other objects in view the invention consists in certain novel features of construction, and combinations and arrangements of parts as will be more fully hereinafter described and pointed out in the claims.

In the accompanying drawings—

Figure 1 is a view in side elevation partly broken away showing a storage battery and illustrating the application of my improvements;

Figs. 2, 3 and 4 are edge views of separators of various shapes;

Fig. 5 is a view in side elevation showing a perforated separator; and

Fig. 6 is a perspective view of a separator.

Fig. 1 represents a storage battery casing and 2 and 3 are the battery plates with my improved separators 4 between them. Fig. 2 illustrates a separator 4 having enlarged portions 5 at its ends and at its center. Fig. 3 shows a separator 4 having grooves 6 in one face. Fig. 4 shows a separator 4 having grooves 7 in both faces, and Fig. 5 shows a separator 4 having perforations 8 therein. Fig. 6 is a perspective view of the separator shown in Fig. 2.

In constructing my improved separator I may use a sheet of slate or I may pulverize or grind the slate and then press it into the desired shape. I may also give the separator any desired surface shape and I may perforate the separator or not, as desired.

My invention consists broadly in the use of a slate separator which I believe is a vast improvement in the art and I therefore do not wish to be limited to any particular construction of such device except as is necessary to perform its function as a separator between the plates of a storage battery.

Various slight changes may be made in the general form and arrangement of parts described without departing from the invention, and hence I do not limit myself to the precise details set forth but consider myself at liberty to make such changes and alterations as fairly fall within the spirit and scope of the appended claims.

I claim:

1. As a new article of manufacture, a slate separator for storage batteries.

2. As a new article of manufacture, a perforated slate separator for storage batteries.

3. A separator for storage batteries, composed of slate and having longitudinal grooves in its face.

4. A separator for storage batteries, composed of slate and having grooves in its face, and perforations extending therethrough.

WILLIAM BEST.